United States Patent
Oono et al.

(10) Patent No.: US 7,990,494 B2
(45) Date of Patent: Aug. 2, 2011

(54) LIQUID CRYSTAL DISPLAY INCLUDING CIRCULAR OR POLYGONAL POLARIZING PLATES EACH WHOSE ABSORPTION AND TRANSMISSION AXES HAVE IMPROVED PRECISION IN DIRECTION

(75) Inventors: Atsuko Oono, Fukaya (JP); Tatsuaki Kuji, Ageo (JP); Yoshitaka Yamada, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 31 days.

(21) Appl. No.: 12/267,861

(22) Filed: Nov. 10, 2008

(65) Prior Publication Data
US 2009/0128749 A1    May 21, 2009

(30) Foreign Application Priority Data
Nov. 20, 2007    (JP) .................. 2007-300498

(51) Int. Cl.
*G02F 1/1335*    (2006.01)

(52) U.S. Cl. ............ 349/96; 349/119; 349/158
(58) Field of Classification Search ............ 349/96, 349/56, 58, 84, 117, 119, 122, 158–160, 349/187
See application file for complete search history.

(56) References Cited

U.S. PATENT DOCUMENTS
7,253,865 B2 * 8/2007 Battersby ............ 349/146
2007/0211335 A1   9/2007 Ikeda et al.

FOREIGN PATENT DOCUMENTS
JP    2002-214599    *  7/2002
JP    2005-326831       11/2005

* cited by examiner

*Primary Examiner* — Brian M. Healy
*Assistant Examiner* — Michael P Mooney
(74) *Attorney, Agent, or Firm* — Oblon, Spivak, McClelland, Maier & Neustadt, L.L.P.

(57) ABSTRACT

A peripheral part of a substrate 1A includes a straight line part 1a. Similarly, a peripheral part of a substrate 1B includes a straight line part. A peripheral part of a polarizing plate 2 is formed of a curved part, and includes a straight line part 2a.

4 Claims, 3 Drawing Sheets

BACKGROUND ART

LIQUID CRYSTAL DISPLAY INCLUDING CIRCULAR OR POLYGONAL POLARIZING PLATES EACH WHOSE ABSORPTION AND TRANSMISSION AXES HAVE IMPROVED PRECISION IN DIRECTION

CROSS-REFERENCE TO RELATED APPLICATIONS

This application is based upon and claims the benefit of priority from Japanese Patent Application No. 2007-300498 filed on Nov. 20, 2007 the entire contents of which are incorporated herein by reference.

BACKGROUND OF THE INVENTION

1. Field of the Invention

The present invention relates to a liquid crystal display including circular or polygonal polarizing plates each whose absorption and transmission axes have an improved precision in direction.

2. Description of the Related Art

Conventional laptop personal computers, mobile television receivers, cellular phones and the like include a rectangular display screen configured of a liquid crystal display.

As shown in FIG. 1, the liquid crystal display is provided with a rectangular polarizing plate 2 on the front surface of a substrate 1A, and similarly provided with the other rectangular polarizing plate (not illustrated; hereinafter referred to as a "rear polarizing plate") on the unillustrated rear surface of the substrate 1B.

An absorption axis 2FK of the polarizing plate 2 is arranged vertical to an absorption axis 2RK of the rear polarizing plate. FIG. 1 illustrates the longest ones, arranged diagonally to each other, of the absorption axes 2FK and 2RK. The lengths of such absorption axes as well as the transmission axes vertical to the respective absorption axes are relatively long.

In general, under a high-temperature or high-temperature/high-humidity condition, PVA (polyvinyl alcohol) layers respectively of the polarizing plate 2 and the rear polarizing plate contracts in a direction of the absorption axes of the polarizing plate.

When phase difference plates are respectively attached to the polarizing plate 2 and the rear polarizing plate, the axial directions of each phase difference plate and the axial directions of the corresponding polarizing plate are misaligned from each other to a large extent, especially in a periphery of the display screen due to contraction of the PVA layer of the polarizing plate. As a result, display becomes uneven in the periphery (what is termed as a "picture frame") of the display screen.

FIG. 2 shows the absorption axes 2FK and 2RK each arranged to stretch along either side of the display. The absorption axes 2FK and 2RK as well as their corresponding transmission axes are equal to each other in length, and are shorter than those shown in FIG. 1, and therefore the PVA layers contract to a smaller extent.

When a phase difference plate is attached to the polarizing plate 2 and the rear polarizing plate, a misalignment between the axial directions of each phase difference plate and the axial directions of the corresponding polarizing plate becomes small, the misalignment being caused by contraction of the PVA layer of the polarizing plate. As a result, it is possible to reduce display unevenness in the periphery (picture frame) of the display screen.

Recently, on the other hand, for the purpose of achieving higher contrast and resolution, there has been an increasing demand for improving the precision in the directions of transmission and absorption axes in polarizing plate relative to a liquid crystal layer.

When a rectangular polarizing plate is used, an inspection is performed to check whether a desired angle is formed between one side of the rectangle as a reference (hereinafter referred to as a "reference side") and each of the absorption and transmission axes of the polarizing plate. After a polarizing plate which has passed this inspection is attached to the substrate, a similar inspection is performed to check whether a desired angle is formed between a reference direction of the substrate and the reference side of the polarizing plate.

Through these inspections, the precision in the directions of the respective absorption and transmission axes can be ensured.

Recent models of cellular phone often include a display screen in the shape of a circle or a polygon with five or more angles. Such a display screen is provided, for example, in the rear of the rectangular display screen.

In addition, there is a tendency in automobiles that display screens configured of a liquid crystal display are provided for indicators and front panel. For this reason, it is expected that display screens with various shapes will be demanded soon.

However, when a circular polarizing plate is used, the above-described inspections can not be performed because the circular polarizing plate has no reference side. As a result, it is likely that the direction of the absorption axis of the polarizing plate or the direction of transmission axis thereof may not be ensured with high precision.

Likewise, when a polygonal polarizing plate is used, the inspections can not be performed unless a reference side is defined. As a result, it is likely that the direction of the absorption axis of the polarizing plate or the direction of transmission axis thereof may not be ensured with high precision.

The present invention has been made with the foregoing points being taken into consideration. An object of the present invention is to provide a liquid crystal display including circular or polygonal polarizing plates each whose absorption and transmission axes have an improved precision in direction.

SUMMARY OF THE INVENTION

A liquid crystal display according to a first aspect of the present invention includes: paired substrates; a liquid crystal layer held between the paired substrates; polarizing plates provided on the respective substrates, each polarizing plate having a peripheral part which is formed of a curved part, and which includes one straight line part.

The first aspect of the present invention causes the peripheral part of each polarizing plate to include the straight line part. By use of the straight line, it is possible to check whether the directions of absorption and transmission axes of each polarizing plate are appropriate, which in turn improves the precision in the directions thereof.

A liquid crystal display according to a second aspect of the present invention is the liquid crystal display according to the first aspect of the present invention characterized in that the peripheral part of each polarizing plate includes another straight line part in addition to the one straight line part, and in that the one straight line part is visibly distinguishable from the other straight line part.

The second aspect of the present invention causes the one straight line part to be visibly distinguishable from the other straight line part, and therefore, by use of the one straight line part, it is possible to check whether the directions of the absorption and transmission axes of each polarizing plate are appropriate, which in turn improves the precision in the directions thereof.

A liquid crystal display according to a third aspect of the present invention is the liquid crystal display according to the first or second aspect of the present invention characterized in that a phase difference plate is provided to each polarizing plate, and in that the absorption axis of each polarizing plate is vertical to or parallel to the one straight line part of the polarizing plate.

Because the third aspect of the present invention causes, for example, the absorption axis of one of the polarizing plates to be vertical to the straight line part of the polarizing plate, the absorption axis is shorter in length than a liquid crystal display having the absorption axis diagonal to the straight line part. This makes the PVA layer of the polarizing plate contract to a smaller extent.

In addition, because the third aspect of the present invention causes the absorption axis of the other polarizing plate to be parallel to the straight line part of the polarizing plate, the transmission axis vertical to the absorption axis is shorter in length than a liquid crystal display having the absorption axis diagonal to the straight line part. This makes the PVA layer of the rear polarizing plate contract to a smaller extent.

For this reason, the third aspect of the present invention makes each phase difference plate and its corresponding polarizing plate less likely to be misaligned from each other in the axial directions in their peripheral parts, which in turn reduces display unevenness.

A liquid crystal display according to a fourth aspect of the present invention includes: paired substrates; a liquid crystal layer held between the paired substrates; polarizing plates provided the respective substrates, each polarizing being formed of at least five straight line parts, and one of the straight line parts being visibly distinguishable from the others of the straight line parts.

The fourth aspect of the present invention causes one straight line part to be visibly distinguishable from the other straight line parts, and therefore, by use of the one straight line part, it is possible to check whether the directions of the respective absorption and transmission axes of each polarizing plate are appropriate, which in turn improves the precision in the directions of the respective axes thereof.

A liquid crystal display according to a fifth aspect of the present invention is the liquid crystal display according to the second or fourth aspect of the present invention characterized in that the one straight line part is different in length from the other straight line parts.

Because the fifth aspect of the present invention causes the one straight line part to be different in length from the other straight line parts, the one straight line part is visibly distinguishable from the other straight line parts. Accordingly, the fifth aspect of the present invention improves the precision in the directions of the respective absorption and transmission axes of each polarizing plate.

DESCRIPTION OF THE EMBODIMENT

Figure 1:
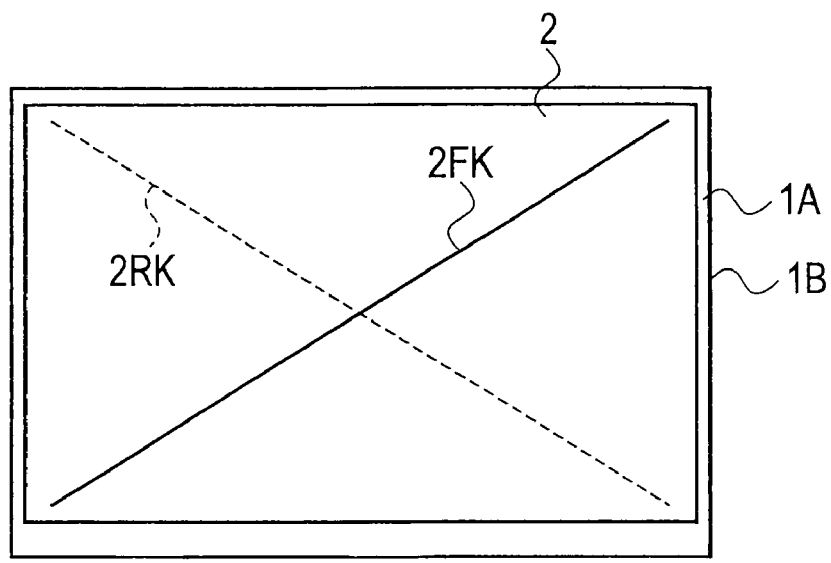
FIG. 1 shows a schematic plan view of a conventional liquid crystal display provided with polarizing plates each including an absorption axis arranged in a diagonal direction.
Figure 2:
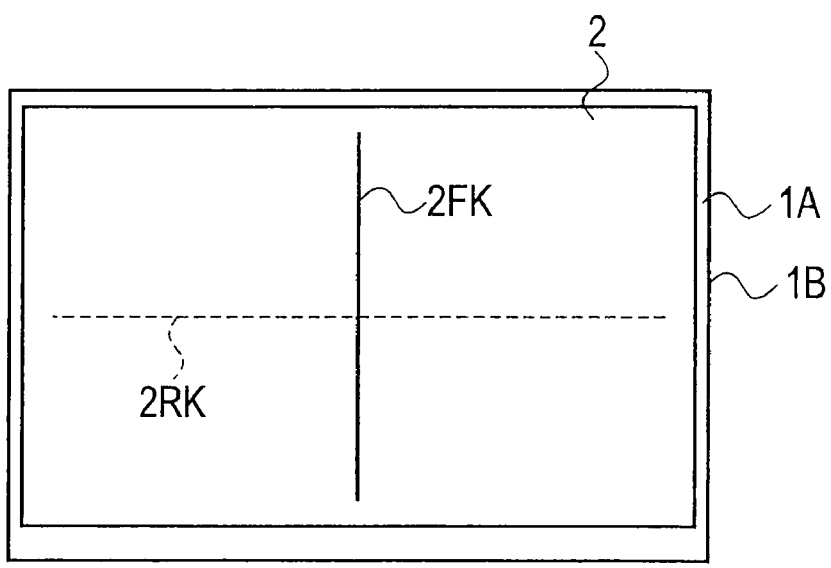
FIG. 2 shows a schematic view of another conventional liquid crystal display provided with polarizing plates each including an absorption axis arranged in a side-to-side direction.
Figure 3:
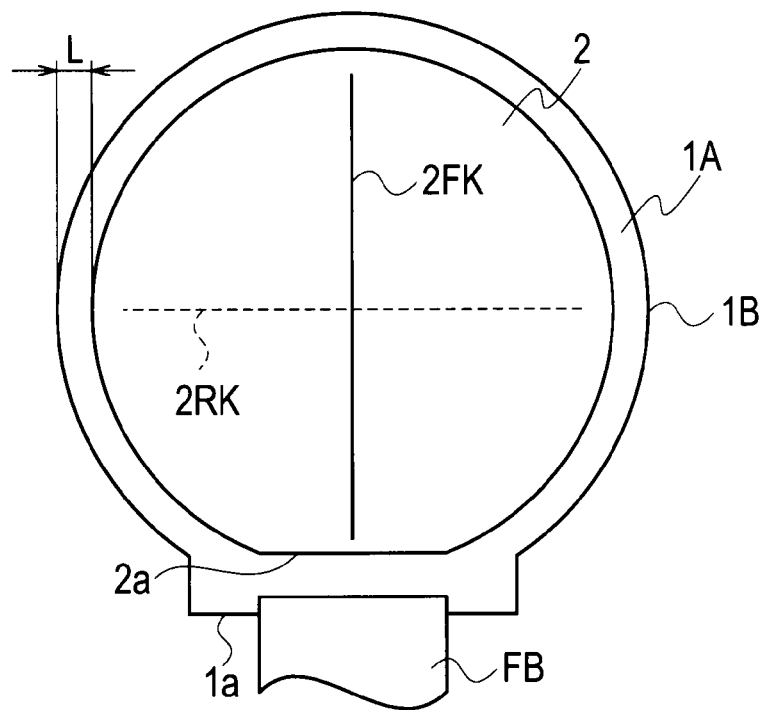
FIG. 3 shows a schematic plan view of a liquid crystal display according to an embodiment of the present invention.

As shown in FIG. 3, a liquid crystal display according to the present invention includes: substrates 1A and 1B each provided with an approximately circular peripheral part; a liquid crystal layer (not illustrated) held between the substrates 1A and 1B; a polarizing plate 2 adhered to the front surface of the substrate 1A; a polarizing plate (hereinafter referred to as a "rear polarizing plate") adhered to the rear surface of the substrate 1B; a backlight (not illustrated) provided in the rear of the rear polarizing plate. The substrates 1A and 1B are made of glass or the like.

The peripheral part of the substrate 1A includes a straight line part 1a. Similarly, the peripheral part of the substrate 1B includes a straight line part. The straight line parts of the substrates 1A and 1B are aligned with each other.

A flexible substrate FB is connected to the straight line part 1a of the substrate 1A by OLB (Outer Lead Bonding).

The peripheral part of the polarizing plate 2 is formed of a curved part, and includes a straight line part 2a. Similarly, the peripheral part of the rear polarizing plate is formed of a curved part, and includes a straight line part. The straight line parts of the polarizing plates are aligned with each other.

A phase difference plate (not illustrated) configured to convert elliptically-polarized light having come out of the liquid crystal layer to linearly-polarized light is attached to the liquid-crystal-layer-side surface of the polarizing plate 2.

An absorption axis 2FK of the polarizing plate 2 is vertical to the straight line part 2a. An absorption axis 2RK of the rear polarizing plate is parallel to the straight line part of the rear polarizing plate.

In other words, a transmission axis (not illustrated) of the polarizing plate 2 is parallel to the straight line part 2a. A transmission axis (not illustrated) of the rear polarizing plate is vertical to the straight line part of the rear polarizing plate.

Before the polarizing plate 2 is adhered to the substrate 1A, an inspection is performed to check whether the straight line part 2a is vertical to the absorption axis 2FK. Before the rear polarizing plate is adhered to the substrate 1B, an inspection is performed to check whether the straight line part of the rear polarizing plate is parallel to the absorption axis 2RK.

After the polarizing plate 2 and the rear polarizing plate having passed this inspection are adhered respectively to the substrates 1A and 1B, a further inspection is performed to check whether a reference direction, for example, the direction of the straight line part 1a of the substrate 1A, is parallel to the straight line part 2a of the polarizing plate 2. An inspection is performed to check whether the direction of the straight line part of the substrate 1B as a reference direction is parallel to the straight line part of the rear polarizing plate. An inspection is performed to check whether the distance L between the peripheral part of the polarizing plate 2 and the peripheral part of the substrate 1A on one side and the distance between the peripheral part of the polarizing plate 2 and the peripheral part of the substrate 1A on the other side are appropriate.

In the present embodiment, because the polarizing plate 2 includes the straight line part 2a, and the rear polarizing plate includes its own straight line part, it is able to check whether the directions of the absorption axes of the respective polarizing plates are appropriate by use of the straight line part 2a. As a consequence, the precision in the directions thereof can be improved.

Because the transmission axis of the polarizing plate 2 is vertical to the absorption axis 2FK, and the transmission axis of the rear polarizing plate is vertical to the absorption axis 2RK, the precision in the directions of these transmission axes can be improved as well.

Because the absorption axis 2FK is vertical to the straight line part 2a, the absorption axis 2FK is shorter in length than a liquid crystal display having the absorption axis 2FK diagonal to the straight line part 2a. This makes polyvinyl alcohol contract to a smaller extent on the phase difference plate provided to the polarizing plate 2.

Because the absorption axis 2RK is parallel to the straight line part of the rear polarizing plate, the transmission axis of the rear polarizing plate that is vertical to the absorption axis 2RK is shorter in length than a liquid crystal display having the absorption axis 2RK diagonal to the straight line part of the rear polarizing plate. This makes polyvinyl alcohol contract to a smaller extent on the phase difference plate provided to the rear polarizing plate.

Consequently, as polyvinyl alcohol contracts to a smaller extent on each phase difference plate, display unevenness is reduced.

In addition, an area between the straight line part 2a and the straight line part 1a can be used for heat radiation. Specifically, heat produced when the flexible substrate FB is connected to the substrate 1A is cooled down in this area. This prevents the polarizing plate 2 from deteriorating due to the heat.

Furthermore, even when an IC chip (Chip on Board) is mounted near the straight line part 1a, the area can be used for heat radiation, and therefore prevents the polarizing plate 2 from deteriorating due to the heat.

Figure 4:
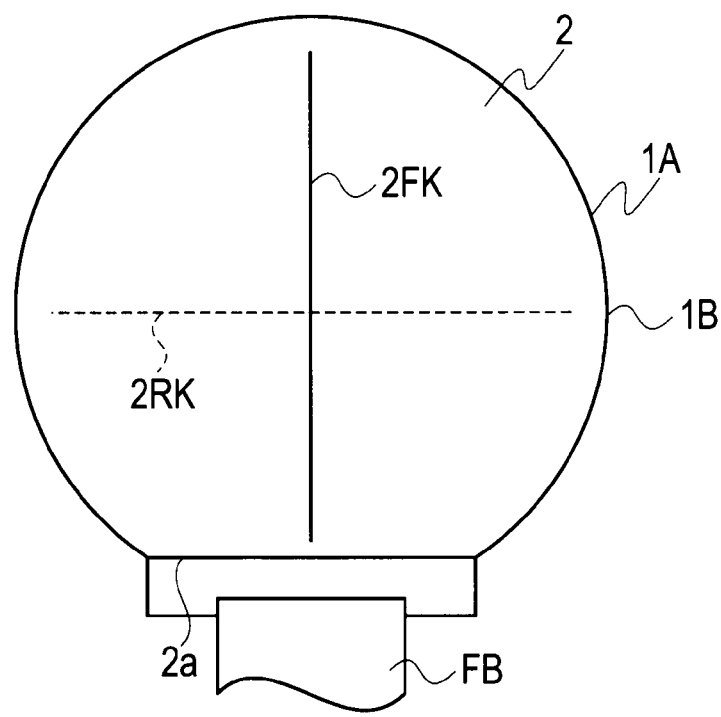
FIG. 4 shows a schematic plan view of a liquid crystal display produced by cutting out its substrates and polarizing plates simultaneously.

As shown in FIG. 4, when a liquid crystal display produced by cutting out its substrates 1A and 1B, the polarizing plate 2 and the rear polarizing plate simultaneously, the inspections can be similarly carried out by providing the polarizing plate 2 with the straight line part 2a and by providing the rear polarizing plate with its straight line part. Thus, the precision in the directions of the absorption axes and the transmission axes can be improved.

In addition, by having the absorption axis 2FK of the polarizing plate 2 parallel to the straight line part 2a as well as having the absorption axis 2RK of the rear polarizing plate vertical to the corresponding straight line part, the liquid crystal display shown in FIG. 4 can reduce display unevenness.

Figure 5:
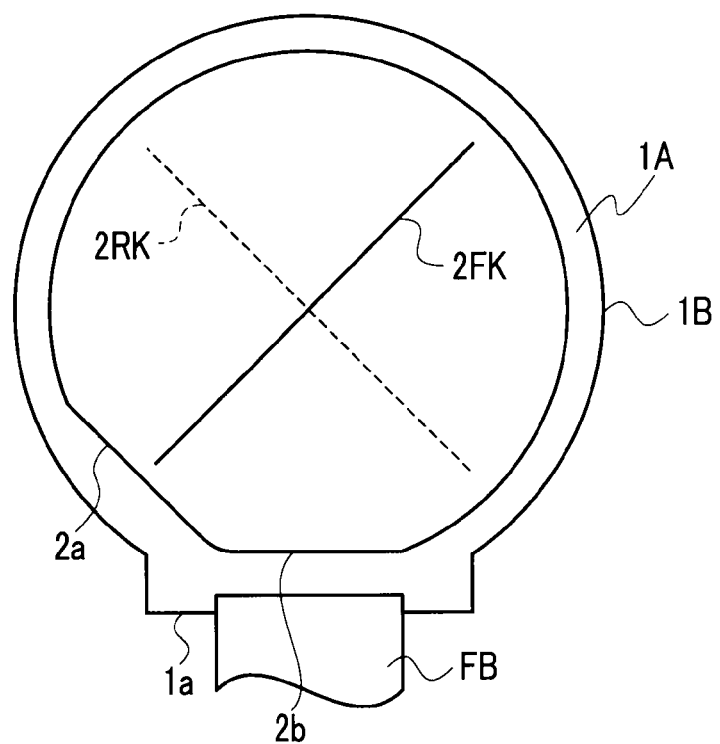
FIG. 5 shows a schematic plan view of a liquid crystal display provided with polarizing plates each including a curved part and multiple straight line parts on their peripheral part.

Furthermore, when the peripheral part of the polarizing plate 2 includes another straight line part 2b in addition to the straight line part 2a as shown in FIG. 5, it is desirable that the straight line part 2a should be arranged to be visibly distinguishable from the straight line part 2b. For example, the length of the straight line part 2a should be different from the straight line part 2b. This is also the case with the rear polarizing plate. Thereby, it is possible to carry out an inspection using, for example, an angle between the straight line part 2a and the straight part 1a of the substrate 1A, and consequently improving the precision in the directions of the absorption axes and the transmission axes.

Moreover, by having the absorption axis 2FK of the polarizing plate 2 parallel to the straight line part 2a as well as having the absorption axis 2RK of the rear polarizing plate vertical to the corresponding straight line part, the liquid crystal display shown in FIG. 5 can reduce display unevenness as well.

Note that, in the liquid crystal display shown in FIGS. 5 and 3, it is allowed that the substrates are polygonal whereas the polarizing plates each including the curved part remain unchanged.

Figure 6:
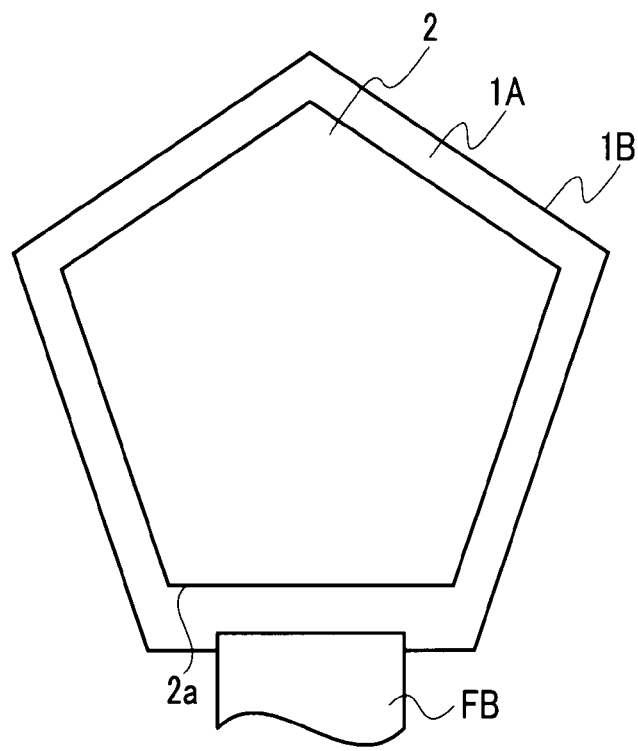
FIG. 6 shows a schematic plan view of a liquid crystal display provided with polarizing plates each including only multiple straight line parts on their peripheral part.

Additionally, as shown in FIG. 6, when the peripheral part of the substrates 1A and 1B is formed of, for example, five or more straight line parts, and also the polarizing plate 2 includes five or more straight line parts, it is desirable that the straight line part 2a should be arranged to be visibly distinguishable from the other straight line parts. For example, the length of one straight line part 2a should be different from the other straight line parts. This is also the case with the rear polarizing plate. This enables to improve the precision in the directions of the absorption axes and the transmission axes.

In the case of the present embodiment, the direction of the straight line part 1a of the substrate 1A is used as the reference direction, yet other direction may be also defined as the reference direction to inspect the directions of the absorption axes and the transmission axes.

What is claimed is:

1. A liquid crystal display comprising:
   paired substrates each including a peripheral part formed in a substantially circular shape, a portion of the peripheral part projecting outward with a straight line part provided at a leading end thereof, the straight line parts of the respective substrates being aligned with each other;
   a liquid crystal layer held between the paired substrates; and
   polarizing plates provided on the respective substrates, each polarizing plate having a peripheral part which includes a curved part while including one straight line part, the curved part extending along a circular portion of the peripheral part of the corresponding substrate, the straight line part of the polarizing plate directly connecting end portions of the curved part, wherein
   the straight line part of each substrate and the straight line part of the corresponding polarizing plate are arranged in parallel with each other with a space interposed in between.

2. The liquid crystal display according to claim 1, wherein
   a phase difference plate is further provided to each polarizing plate,
   an absorption axis of each polarizing plate is vertical or parallel to the straight line part of the polarizing plate, and
   the absorption axes of the respective polarizing plates are placed orthogonal to each other.

3. The liquid crystal display according to claim 1, wherein
   an absorption axis of one of the polarizing plates provided on the respective substrates is set vertical to the straight line part of the one polarizing plate, and
   an absorption axis of the other polarizing plate is set in parallel with the straight line part of the other polarizing plate.

4. The liquid crystal display according to claim 1, wherein
   any one of a flexible substrate, an IC chip, and another component other than the flexible substrate and the IC chip is connected to the straight line part of one of the substrates.

* * * * *